US011851123B2

(12) United States Patent
Ooba et al.

(10) Patent No.: US 11,851,123 B2
(45) Date of Patent: Dec. 26, 2023

(54) HUB UNIT HAVING STEERING FUNCTION, AND VEHICLE EQUIPPED WITH SAME

(71) Applicant: NTN CORPORATION, Osaka (JP)

(72) Inventors: Hirokazu Ooba, Iwata (JP); Yusuke Ohata, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/903,090

(22) Filed: Sep. 6, 2022

(65) Prior Publication Data
US 2022/0410969 A1     Dec. 29, 2022

Related U.S. Application Data

(63) Continuation of application No. PCT/JP2021/008560, filed on Mar. 4, 2021.

(30) Foreign Application Priority Data

Mar. 10, 2020 (JP) ................. 2020-040443

(51) Int. Cl.
*B62D 7/08*  (2006.01)
*B62D 7/18*  (2006.01)
*F16C 19/49*  (2006.01)

(52) U.S. Cl.
CPC ............. *B62D 7/18* (2013.01); *B62D 7/08* (2013.01); *F16C 19/49* (2013.01); *F16C 2326/02* (2013.01)

(58) Field of Classification Search
CPC ....... B60B 27/00; B60B 35/02; B62D 5/0418; B62D 7/08; B62D 7/18; F16C 19/186;
(Continued)

(56) References Cited

U.S. PATENT DOCUMENTS

| 11,097,768 B2 | 8/2021 | Ooba et al. |
| 2020/0122771 A1 | 4/2020 | Ooba et al. |
| 2021/0001921 A1* | 1/2021 | Ishihara ................. B62D 5/006 |

FOREIGN PATENT DOCUMENTS

| DE | 39 28 135 A1 | 3/1990 |
| DE | 10 2012 206 337 A1 | 10/2013 |

(Continued)

OTHER PUBLICATIONS

International Search Report issued in International Application No. PCT/JP2021/008560 dated May 18, 2021.

(Continued)

*Primary Examiner* — Jason D Shanske
*Assistant Examiner* — Daniel M. Keck

(57) ABSTRACT

The steering function-equipped hub unit includes: a turning shaft-equipped hub bearing including an inner ring, an outer ring, and rolling elements in double rows interposed between the inner ring and the outer ring, the turning shaft-equipped hub bearing having a turning shaft extending in a vertical direction; a unit support member rotatably supporting the turning shaft-equipped hub bearing (15) about a turning axis of the turning shaft; and a steering actuator configured to rotationally drive the turning shaft-equipped hub bearing about the turning axis (A). The unit support member and the steering actuator include a flange and an end portion, respectively, to be removably fixed to a knuckle which is a chassis frame component of a vehicle.

6 Claims, 7 Drawing Sheets

(58) Field of Classification Search
CPC .. F16C 19/49; F16C 2326/02; F16C 2326/24; F16C 35/077
See application file for complete search history.

(56) References Cited

FOREIGN PATENT DOCUMENTS

| | | | | |
|---|---|---|---|---|
| EP | 2335962 A1 * | 6/2011 | ........... | B60K 17/043 |
| JP | 2005-178653 A | 7/2005 | | |
| JP | 2013-112112 A | 6/2013 | | |
| JP | 2019-6226 A | 1/2019 | | |
| WO | WO 2018/235892 A1 | 12/2018 | | |
| WO | WO 2018/235894 A1 | 12/2018 | | |
| WO | WO-2018235891 A1 * | 12/2018 | ............. | B60B 35/02 |
| WO | WO 2019/065778 A1 | 4/2019 | | |
| WO | WO 2019/189102 A1 | 10/2019 | | |
| WO | WO-2023004931 A1 * | 2/2023 | ............. | B60B 35/02 |

OTHER PUBLICATIONS

International Preliminary Report on Patentability dated Sep. 22, 2022 and Written Opinion dated May 18, 2021 in International Patent Application No. PCT/JP2021/008560 (5 pages).

* cited by examiner

HUB UNIT HAVING STEERING FUNCTION, AND VEHICLE EQUIPPED WITH SAME

CROSS REFERENCE TO THE RELATED APPLICATION

This application is a continuation application, under 35 U.S.C. § 111(a) of international patent application No. PCT/JP2021/008560, filed Mar. 4, 2021, which claims priority to Japanese patent application No. 2020-040443, filed Mar. 10, 2020, the entire disclosure of which is herein incorporated by reference as a part of this application.

BACKGROUND OF THE INVENTION

Field of the Invention

The present invention relates to, for example, a steering function-equipped hub unit having a function of supplementarily steering left and right wheels in an independent manner in addition to steering by a steering device as well as to a vehicle including the same. The present invention also relates to a technology of controlling left and right wheels to a suitable steering angle so as to fit a driving condition to improve fuel economy and enhance steering performance and safety.

Description of Related Art

[Instance in Front Wheels]

In vehicles such as general automobiles, a steering wheel is mechanically connected to a steering device, and the steering device has two opposite ends connected to left and right wheels through tie rods. Therefore, turning angles of the left and right wheels in accordance with an operation of the steering wheel are defined by an initial setting.

Known vehicle geometries include:
(1) "parallel geometry" in which left and right wheels have a same turning angle;
(2) "Ackermann geometry" in which an inner wheel in turning is turned by a larger wheel angle than that of an outer wheel in turning so as to have a single center of turning; and
(3) "anti-Ackermann geometry" which attaches importance to cornering performance while driving at high speed (an outer wheel in turning is turned by a larger wheel angle than that for an inner wheel in turning).

In Ackermann geometry, a difference in turning angles of the left and right wheels is set such that the individual wheels turn about a single common point so as to smoothly turn the vehicle when turning in a low-speed range where a negligible centrifugal force acts on the vehicle. In contrast, when turning in a high-speed range where a centrifugal force is not negligible, parallel geometry or anti-Ackermann geometry is preferred to Ackermann geometry because it is desirable that the wheels generate a cornering force in a direction in which the centrifugal force is counterbalanced.

As mentioned above, since a steering device of a general vehicle is mechanically connected to wheels, the steering device can usually assume only a single fixed steering geometry and is often configured in an intermediate geometry between Ackermann geometry and anti-Ackermann geometry. In such a case, however, the turning angle of the outer wheel becomes excessively large in a low-speed range due to an insufficient difference in the turning angles of the left and right wheels, whereas the turning angle of the inner wheel becomes excessively large in a high-speed range. Thus, where there is unnecessarily unbalanced distribution of a wheel lateral force between the inner and outer wheels, travel resistance may be increased, leading to worsening of fuel economy and early wear of the tires. Further, there is another problem that the inner and outer wheels cannot be effectively used, causing deterioration in smooth cornering.

In Patent Document 1, use of two motors in one wheel not only increases the weight and costs because of the increased number of the motors, but also complicates the control.

[Instance in Rear Wheels]

A rear suspension of a vehicle including a general rear-wheel steering mechanism is constituted as an independent suspension. In this case, the rear suspension can push and pull knuckles to steer rear wheels in a same manner as manual steering of front wheels. However, use of an independent suspension has a problem that a chassis has a complicated structure, which increases the cost and makes it difficult to secure a large interior space of the vehicle.

Patent Document 2 proposes an example of a rear-wheel steering mechanism which is applied to a system other than the independent suspension. In this example, an external force is applied to a torsion beam to deform rubber bushes at mount parts (i.e., trailing arms) between the torsion beam and the vehicle body and thereby steer rear wheels. However, this steering mechanism cannot separately control the left and right wheels in an independent manner. In addition, since the maximum steering angle depends on deformation of the rubber bushes, steering can be made only by small angles, and an optimal steering angle is difficult to set.

Patent Document 2 is applied to electric vehicles. A power of a driving motor is diverted to apply an external force to a torsion beam with rotary motion converted to linear motion, so that a lager interior space cannot be provided.

As for the structure of the steering function-equipped hub unit, the present applicant previously proposed an example in which the hub unit is used in conjunction with a steering mechanism and is attached to a front wheel (Patent Document 3) and an example in which the hub unit is attached to a torsion beam (rear wheel) (JP Laid-open Patent Publication No. 2018-183189). In either case, it is necessary to assemble the steering function-equipped hub unit outside the vehicle body and then attach the hub unit as one assembly to the vehicle body. In addition, when the steering function-equipped hub unit requires inspection or replacement due to abnormality occurring therein, it is necessary to replace the assembly.

RELATED DOCUMENT

Patent Document

[Patent Document 1] DE Patent Publication No. 102012206337
[Patent Document 2] JP Laid-open Patent Publication No. 2005-178653
[Patent Document 3] JP Laid-open Patent Publication No. 2019-6226

SUMMARY OF THE INVENTION

Since a steering function-equipped hub unit is an assembly including a unit support member, a turning shaft-equipped hub bearing and a steering actuator, it has been necessary to attach or detach the whole assembly to/from the vehicle.

In addition, when the hub unit requires inspection or replacement due to abnormality or the like, the hub unit must be treated as one assembly to carry out operations. In this case, all wiring must be removed as well, making it cumbersome to perform work.

An object of the present invention is to provide a steering function-equipped hub unit which can be easily attached to or detached from a vehicle and permit operations to be more easily performed during maintenance and the like, and a vehicle including the same.

A steering function-equipped hub unit according to the present invention is a steering function-equipped hub unit configured to steer a wheel, the steering function-equipped hub unit including:
- a turning shaft-equipped hub bearing including an inner ring, an outer ring, and rolling elements in double rows interposed between the inner ring and the outer ring, the turning shaft-equipped hub bearing having a turning shaft extending in a vertical direction;
- a unit support member rotatably supporting the turning shaft-equipped hub bearing about a turning axis of the turning shaft; and
- a steering actuator configured to rotationally drive the turning shaft-equipped hub bearing about the turning axis,
- wherein each of the unit support member and the steering actuator includes a fixing part to be removably fixed to a chassis frame component of a vehicle.

According to this constitution, the unit support member and the steering actuator can be individually attached to and detached from a chassis frame component of a vehicle, which can facilitate operation to attach or detach these components to the vehicle, as compared with a case where these components as a whole are treated as one assembly. When, e.g., abnormality occurs in a component of the steering function-equipped hub unit, only either one of the unit support member and the steering actuator which includes that component can be detached from the chassis frame component for maintenance or replacement, and only necessary wires can be disconnected. Accordingly, this can improve ease of operations during maintenance, etc.

The steering actuator and the unit support member may be attached with the chassis frame component interposed between the steering actuator and the unit support member. In this case, the steering function-equipped hub unit as a whole can be designed compactly, so that the steering function-equipped hub unit can be received on an inner side with respect to the diameter of a wheel disc.

The unit support member may be attached to the chassis frame component on an outer side in a widthwise direction of the vehicle, and the steering actuator may be attached to the chassis frame component on an inner side in the widthwise direction of the vehicle. In this case, there can be shorter paths for connecting wiring such as power wires for the steering actuator and sensor wires to the vehicle body side than those in a case where the steering actuator is attached to the chassis frame component on the outer side in the widthwise direction, and the wiring can be arranged so as to avoid bending. Therefore, this can facilitate arrangement of the wiring and improve ease of operations.

The unit support member may include a flange part on an opposite side to a wheel attachment part of the turning shaft-equipped hub bearing in an axial direction of a wheel, the flange part configured to be fixed to the chassis frame component in an overlapping manner as the fixing part of the unit support member. In this case, it is possible to easily fix the flange part of the unit support member to the chassis frame component in an overlapping manner by a bolt or the like and to easily remove the unit support member from the chassis frame component. In this way, it is possible to attach or detach only the unit support member to/from the chassis frame component, instead of attaching or detaching the whole steering function-equipped hub unit as one assembly. Accordingly, this can improve ease of operations during maintenance, etc.

The steering actuator may include a linear motion mechanism body and a linear motion output part which is able to advance from and retract into the linear motion mechanism body and is configured to apply a steering force to the outer ring of the turning shaft-equipped hub bearing; an end portion of the linear motion mechanism body from which the linear motion output part projects serves as the fixing part of the steering actuator; and the end portion of the linear motion mechanism body is configured to be fixed to the chassis frame component in an overlapping manner. Thus, the steering actuator, which is a part of the steering function-equipped hub unit, can be attached to or detached from the chassis frame component. Accordingly, this can improve ease of operations during maintenance, etc.

A vehicle according to the present invention includes any one of the above-described steering function-equipped hub units. In the steering function-equipped hub unit, the turning shaft-equipped hub bearing is rotatably supported by the unit support member about the turning axis, and the turning shaft-equipped hub bearing is rotationally driven by the steering actuator about the turning axis.

According to this constitution, toe angles of left and right wheels can be independently and arbitrarily changed depending on the driving condition of the vehicle. This makes it possible to improve motion performance of the vehicle and to drive stably and safely. In addition, by individually setting appropriate wheel angles for the left and right wheels, cornering drag can be suppressed to improve fuel economy. Besides, the effects described above for the steering function-equipped hub units according to the present invention can be obtained.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures.

DESCRIPTION OF THE EMBODIMENTS

First Embodiment

A steering function-equipped hub unit according to a first embodiment of the present invention will be described with reference to FIG. 1 to FIG. 5.

<Schematic Structure of Steering Function-Equipped Hub Unit>

Figure 1:
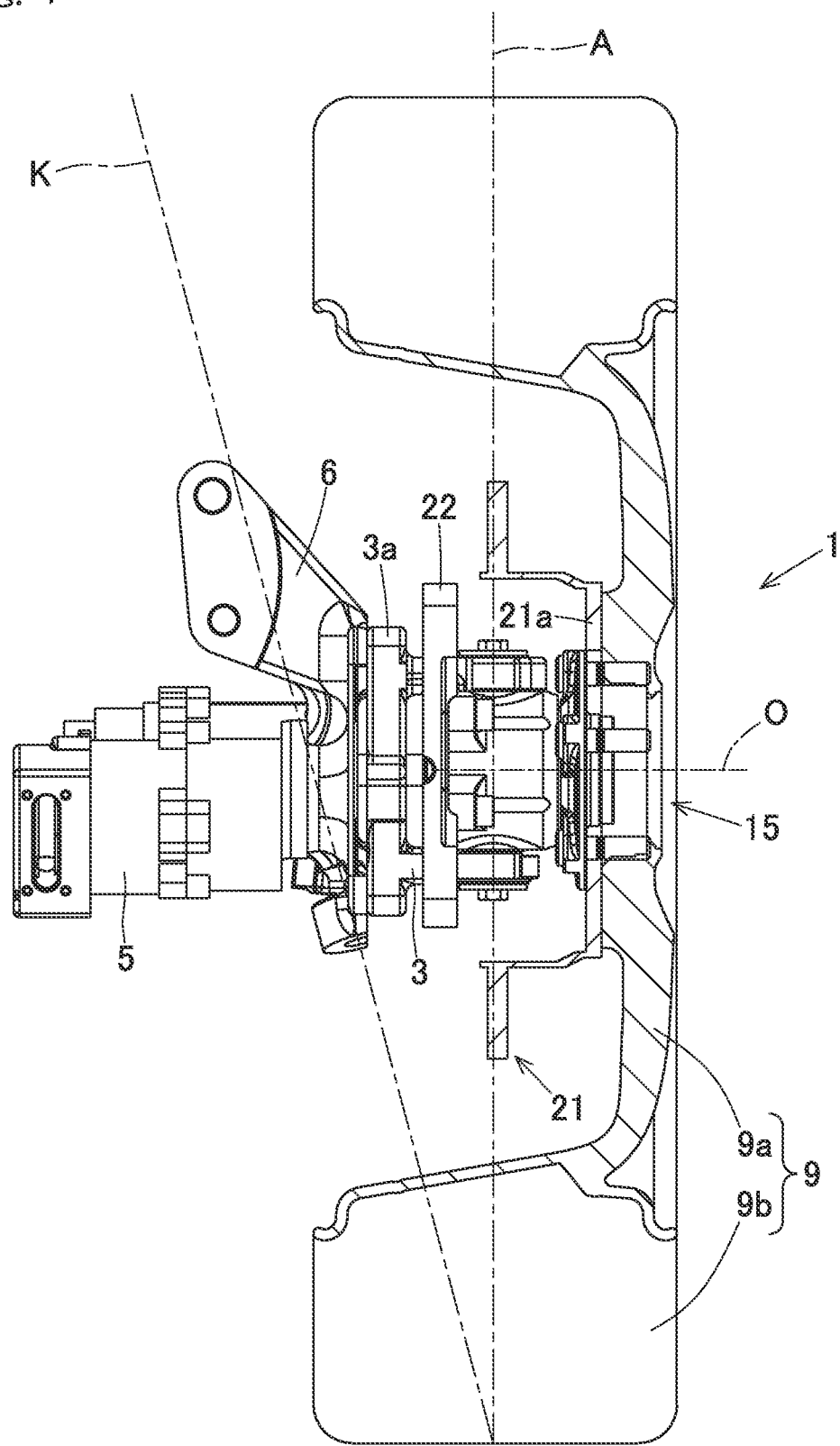
FIG. 1 shows a steering function-equipped hub unit according to a first embodiment of the present invention and surrounding features.
Figure 3:
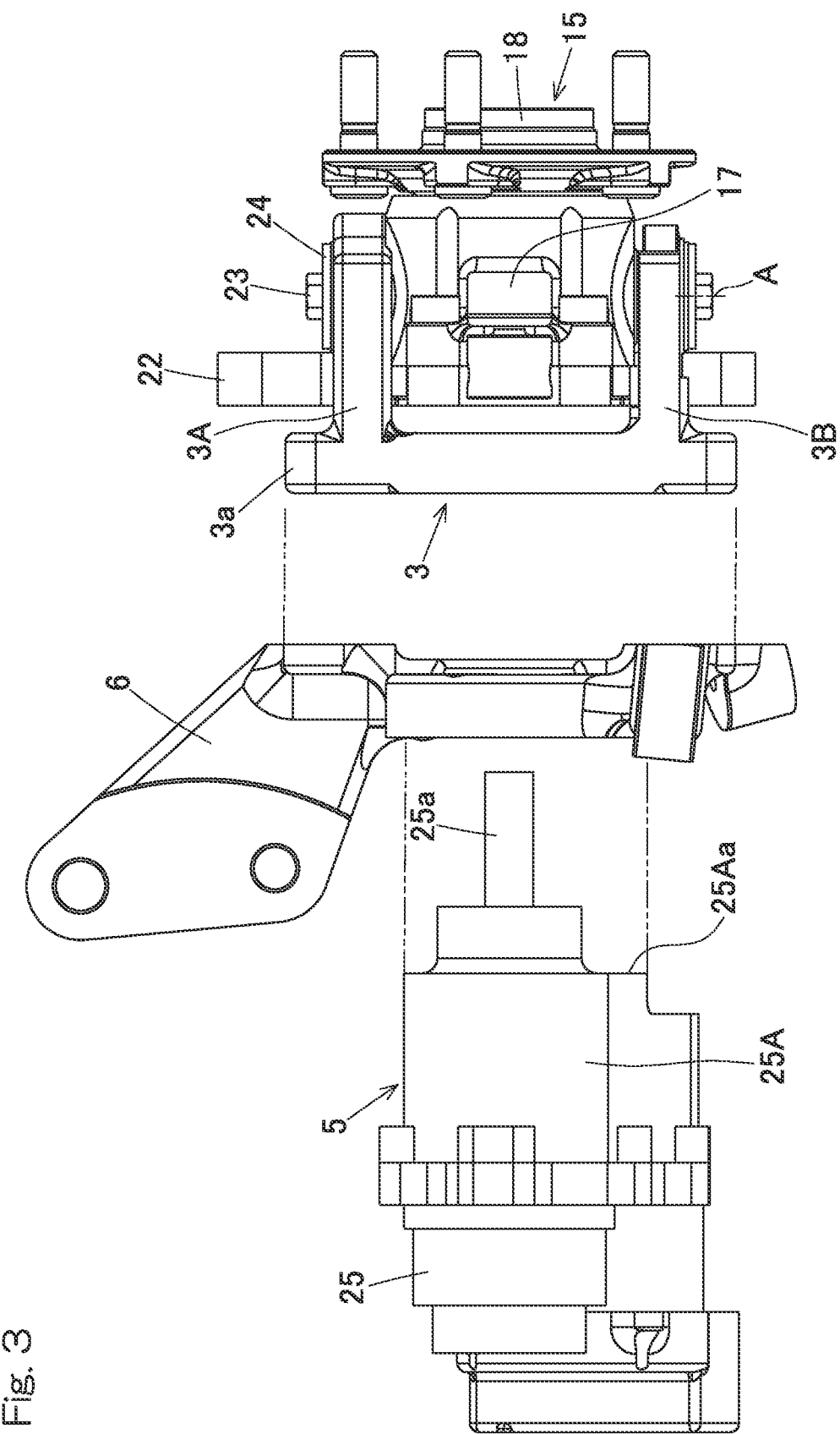
FIG. 3 shows how a steering actuator and the unit support member with the turning shaft-equipped hub bearing attached thereto are assembled in a vehicle.
Figure 4:
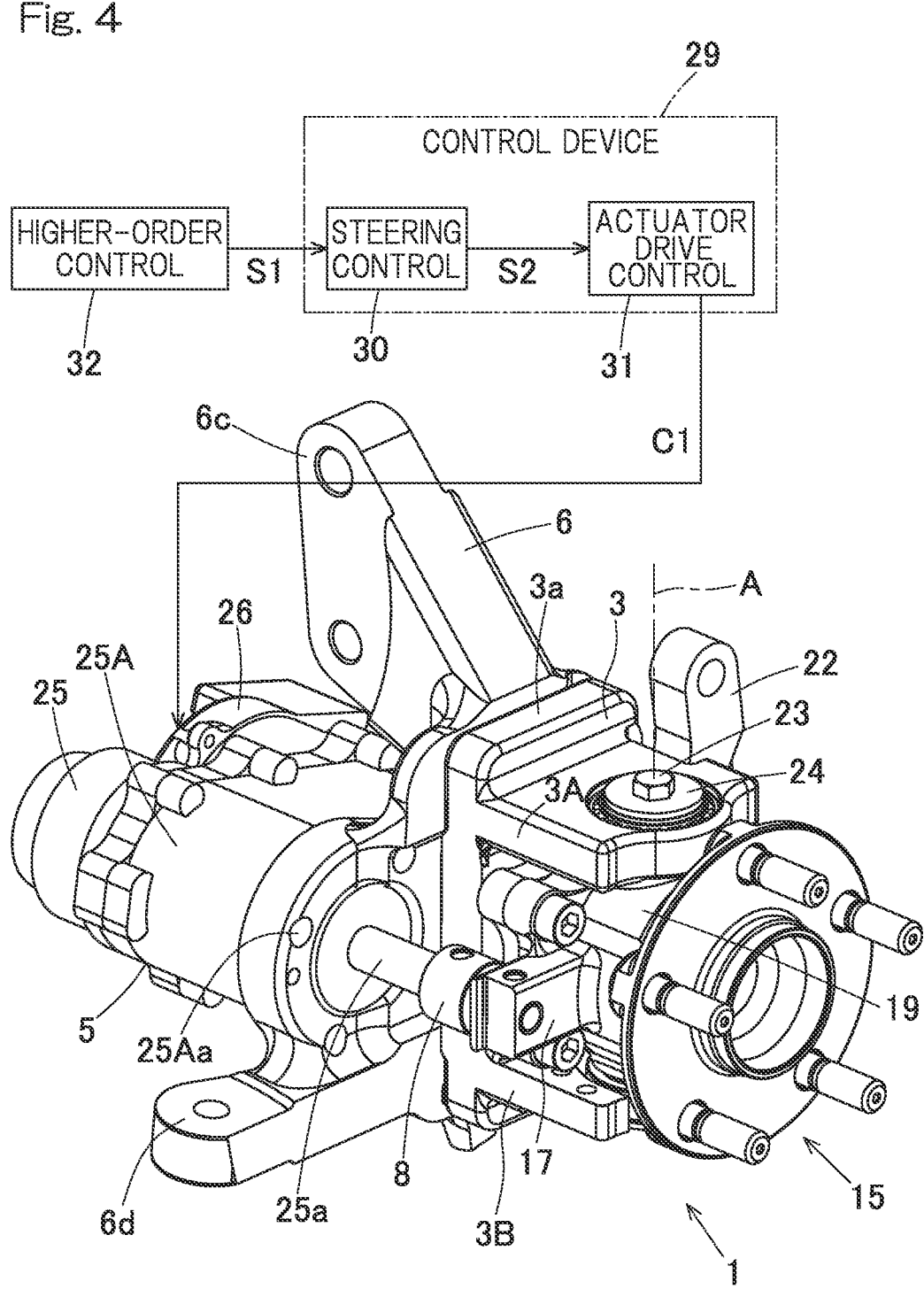
FIG. 4 is a perspective view showing an exterior of the steering function-equipped hub unit.

As shown in FIG. 1, the steering function-equipped hub unit 1 includes a turning shaft-equipped hub bearing 15, a unit support member 3, and a steering actuator 5. As shown in FIG. 3 and FIG. 4, the unit support member 3 and the steering actuator 5 are removably fixed to a knuckle 6 which is one example of a chassis frame component of a vehicle.

Flange parts (fixing parts) 3a of the unit support member 3 are attached to the knuckle 6 on an outboard side, i.e., an outer side in the widthwise direction of the vehicle, while an end portion (fixing part) 25Aa of a linear motion mechanism body 25A described later from which an output rod 25a of the linear motion mechanism body projects is attached to the knuckle 6 on an inboard side, i.e., an inner side in the widthwise direction of the vehicle. That is, the steering actuator 5 and the unit support member 3 are attached with the knuckle 6 interposed therebetween. The unit support member 3 and the steering actuator 5, however, could be removably fixed to the knuckle 6 on a same side, although not illustrated.

The unit support member 3 including the turning shaft-equipped hub bearing 15 attached thereto includes the flange parts 3a with bolt holes as a fixing part, and the linear motion mechanism body 25A of the steering actuator 5 includes the end portion 25Aa with bolt holes as a fixing part. Specifically, the unit support member 3 includes the flange parts 3a on an opposite side to a wheel attachment part 28 of the turning shaft-equipped hub bearing 15 in an axial direction of a wheel, the flange parts configured to be fixed to the knuckle 6 in an overlapping manner by fasteners such as bolts. The flange parts 3a protrude upward and downward over a predetermined distance from inboard-side end portions of upper and lower parts 3A, 3B of the unit support member 3 which support respective rotation-permitting support components 4.

The steering actuator 5 includes the linear motion mechanism body 25A of the linear motion mechanism 25 described later and an output rod (linear motion output part) 25a which is able to advance from and retract into the linear motion mechanism body 25A and configured to apply a steering force to an outer ring 19 of the turning shaft-equipped hub bearing 15. The outboard-side end portion 25Aa of the linear motion mechanism body 25A from which the output rod 25a projects is fixed to the knuckle 6 in an overlapping manner. That is, the outboard-side end portion 25Aa of the linear motion mechanism body 25A serves as the fixing part in the present embodiment. However, it is also possible to provide a flange part protrude radially outward from the outboard-side end portion 25Aa of the linear motion mechanism body 25A to use the flange part as the fixing part of the steering actuator 5, although not illustrated.

Bolts are inserted into the bolt holes of the flange parts 3a and the end portion 25Aa to removably fix the unit support member 3 and the steering actuator 5 to the knuckle 6, respectively, and a joint part 8 further connects the steering actuator 5 and the turning shaft-equipped hub bearing 15. Although it is desirable that the turning shaft-equipped hub bearing 15 is put together with the unit support member 3 before it is mounted in the vehicle, the turning shaft-equipped hub bearing 15 may be put together with the unit support member after the unit support member 3 is attached to the knuckle 6.

Figure 2:
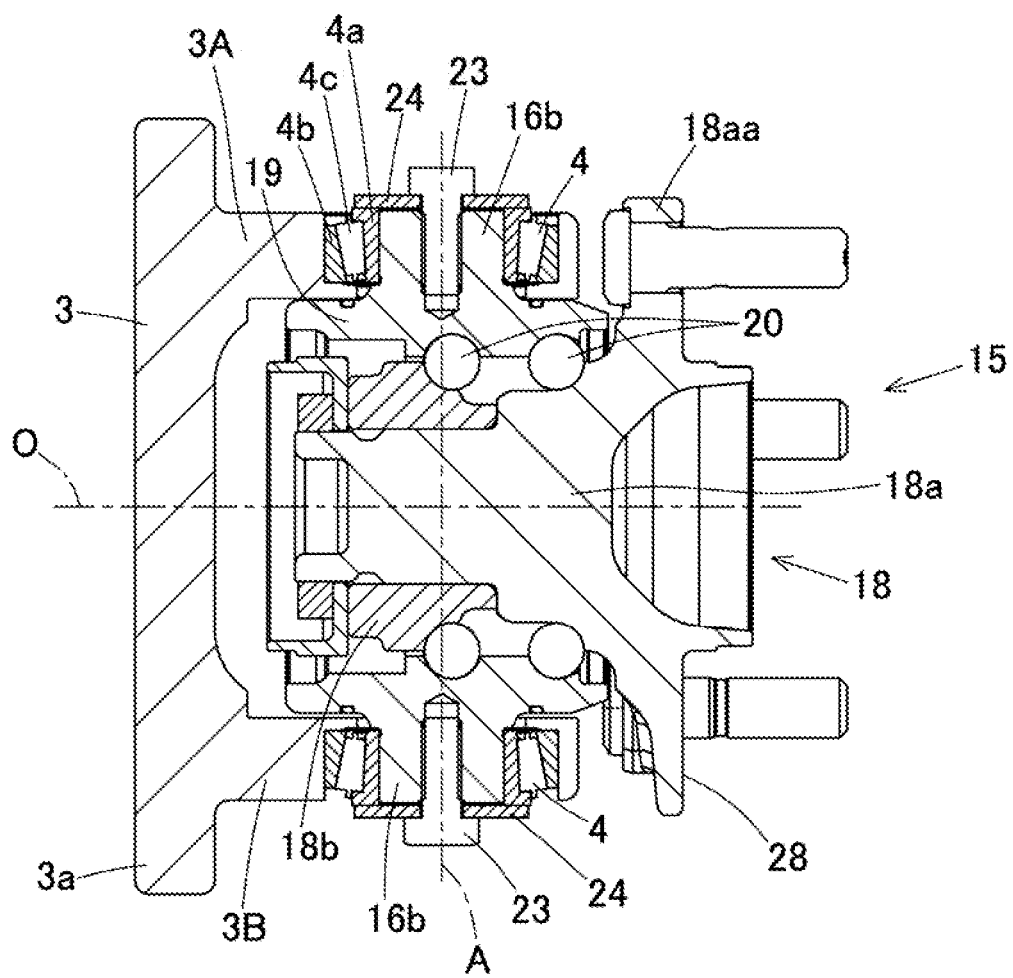
FIG. 2 is a vertical sectional view of a turning shaft-equipped hub bearing and a unit support member of the steering function-equipped hub unit.
Figure 6:
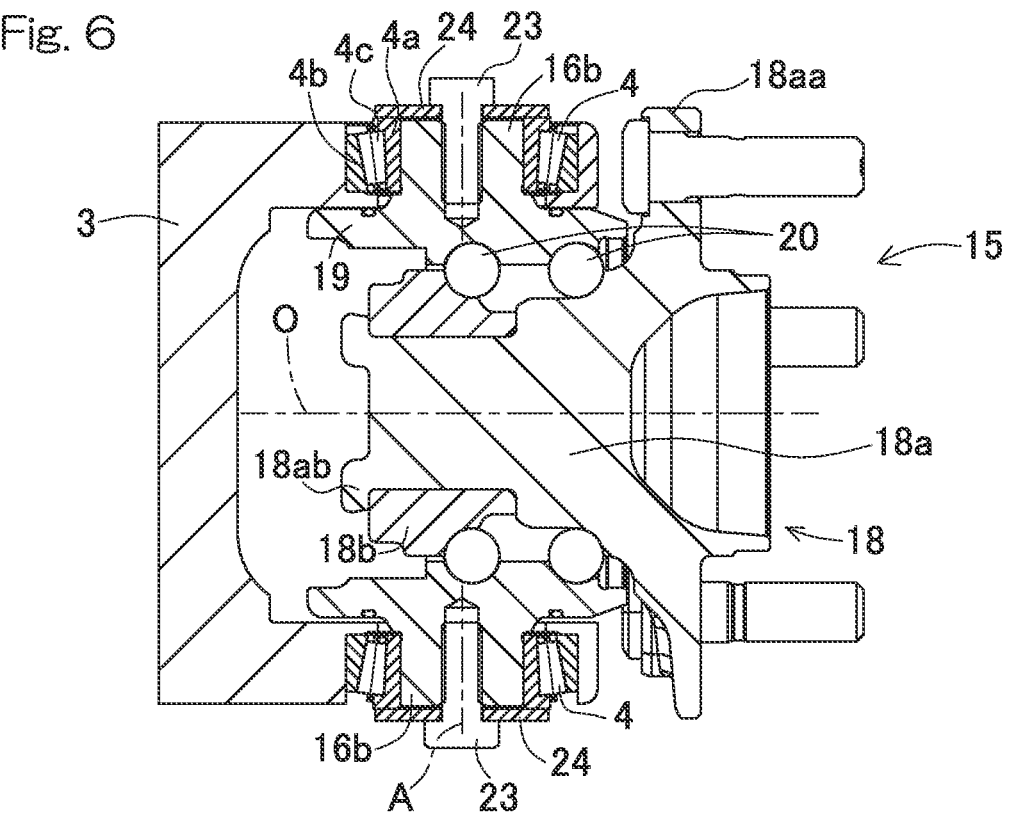
FIG. 6 is a vertical sectional view showing a variant of the steering function-equipped hub unit which is partially modified.

As shown in FIG. 1 and FIG. 2, the turning shaft-equipped hub bearing 15 is supported by the unit support member 3 through rotation-permitting support components 4, 4 disposed at two locations above and below the hub bearing so as to allow turning shafts 16b, 16b extending in a vertical direction to rotate about a turning axis A. The rotation-permitting support components 4, 4 may be rolling bearings or sliding bearings. FIG. 2 and FIG. 6 (which will be described later) show the cases where tapered roller bearings are used as rolling bearings for the rotation-permitting support components 4, whereas FIG. 7 (which will be described later) shows the case where spherical sliding bearings are used as rolling bearings for the rotation-permitting support components 4. As shown in FIG. 1 and FIG. 2, in a general vehicle, a king pin axis K is set in a range from 10 to 20 degrees in order to improve stability of the vehicle during driving straight. In contrast, the steering function-equipped hub unit 1 according to the present embodiment has the turning axis A having a different angle (axis) from that of the king pin axis K. The wheel 9 includes a wheel disc 9a and a tire 9b.

<Installation Position of Steering Function-Equipped Hub Unit 1>

Figure 5:
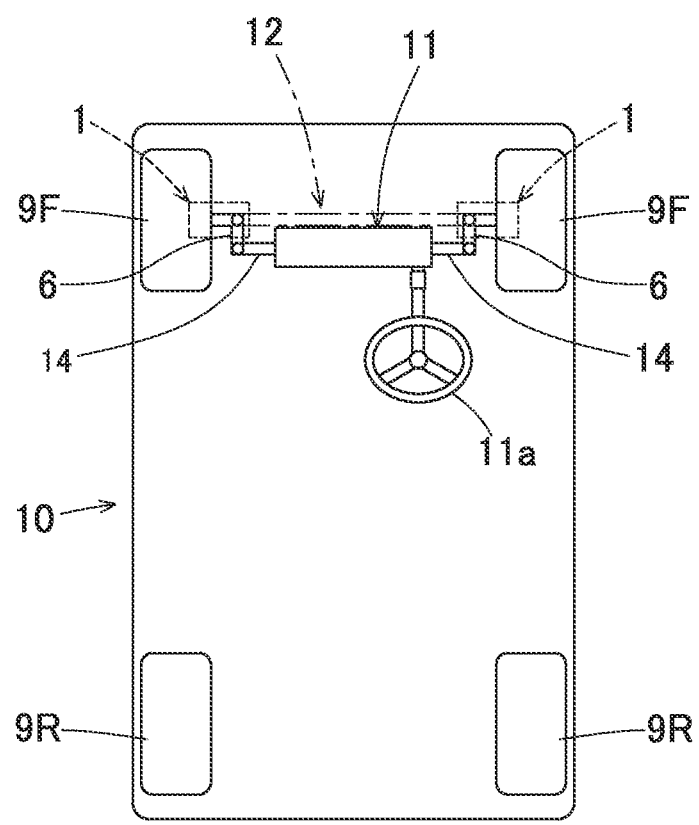
FIG. 5 is a schematic plan view showing one example of a vehicle including the steering function-equipped hub unit.

The steering function-equipped hub unit 1 serves as a mechanism for individually steering corresponding one of left and right wheels by a small angle (about ±5 degrees) in addition to steering by the steered wheels in the present invention or specifically by a steering device 11 for front wheels 9F of the vehicle 10 as shown in FIG. 5 and is installed on a knuckle 6 of the suspension device 12 for the front wheels 9F. The steering function-equipped hub unit 1, however, may individually steer the corresponding one of the left and right wheels by not only the small angle, but also a relatively large angle (e.g. 10° to 20°) depending on demand for vehicle control.

As shown in FIG. 4 and FIG. 5, the steering device 11 is mounted in a vehicle body and is configured to operate in accordance with an operation of the steering wheel 11a by a driver or a command or the like from a non-illustrated autonomous driving device or driving assistance device. The steering device 11 includes tie rods 14 configured to move back and forth and coupled to steering connecting parts 6d provided to knuckles 6. Each knuckle 6 includes: a shock absorber mount part 6c to which a shock absorber is mounted; and a steering device connecting part 6d to which the steering device 11 is connected. The steering device 11 may be a rack and pinion type, or any type of steering devices may be used. As the suspension device 12, for example, a multilink suspension mechanism is used herein. The suspension device 12, however, may be a double wishbone suspension mechanism, a strut suspension mechanism, or any other type of suspension mechanisms.

<Turning Shaft-Equipped Hub Bearing 15>

As shown in FIG. 1, the turning shaft-equipped hub bearing 15 connects a vehicle body-side member to the wheel 9 and allows the wheel 9 to rotate smoothly. As shown in FIG. 2, the turning shaft-equipped hub bearing 15 includes: inner and outer rings 18, 19; rolling elements 20 such as balls interposed between the inner and outer rings 18, 19; and turning shafts 16b, 16b extending in the vertical direction. The turning shaft-equipped hub bearing 15 further includes, as shown in FIG. 4, an arm part (which will be described later) 17 protruding in a direction perpendicular to the turning shafts 16b (FIG. 2).

As shown in FIG. 2, the turning shaft-equipped hub bearing 15 of the illustrated example is an angular contact ball bearing including the outer ring 19 as a stationary ring, the inner ring 18 as a rotary ring, and the rolling elements 20 arranged in double rows. The inner ring 18 includes: a hub axle part 18a having a hub flange 18aa and constituting an outboard-side raceway surface; and an inner ring part 18b constituting an inboard-side raceway surface. As shown in FIG. 1 and FIG. 2, the wheel disc 9a of the wheel 9 is fixed to the hub flange 18aa by a fastening member such as a bolt, with a brake rotor 21a interposed therebetween. The inner ring 18 rotates about the rotation axis O.

The turning shaft 16b, 16b protrude upward and downward from an outer periphery of the outer ring 19 in the form of shaft parts each having a trunnion shaft shape and are arranged coaxial with the turning axis A. The turning shafts 16b are integrally provided with the outer ring 19. Alternatively, however, the turning shafts may protrude upward and downward from, e.g., an outer periphery of an annular part which can be fitted to an outer peripheral surface of the outer ring 19. The term "integrally provided" or the like means that the outer ring 19 and the turning shaft parts 16b are formed as parts of a single entity from a single material by e.g. casting, machining or the like, instead of being constituted by multiple elements jointed together.

As shown in FIG. 1 and FIG. 4, a brake 21 includes the brake rotor 21a and a non-illustrated brake caliper. The brake caliper is mounted to brake caliper mount parts 22 which are formed integrally with the outer ring 19 (FIG. 2) as arm-like protruding parts at two upper and lower locations.

<Unit Support Member, Etc.>

As shown in FIG. 2, each of the rotation-permitting support components 4 is constituted by a rolling bearing. In this example, a tapered roller bearing is used as the rolling bearing. The rolling bearing includes an inner ring 4a fitted to an outer periphery of one turning shaft part 16b; an outer ring 4b fitted to the unit support member 3; and a plurality of rolling elements 4c interposed between the inner ring 4a and the outer ring 4b. The upper and lower rolling bearings are arranged so as to be located inside the wheel disc 9a (FIG. 1). Each of the upper and lower parts 3A, 3B of the unit support member 3 includes a fitting hole, and the outer ring 4b is fittedly fixed to each fitting hole. The fitting holes are coaxial with the turning axis A.

Each of the turning shaft parts 16b is formed with a female thread portion, and a bolt 23 is screwed into the female thread portion. With a disk-like pressing member 24 interposed between the bolt and an end face of the inner ring 4a, the bolt 23 screwed into the female thread portion applies a pressing force to the end face of the inner ring so as to apply an appropriate preload to the corresponding rolling bearing. Thus, the strength and durability of each rotation-permitting support component 4 are secured. An initial preload is set so as to be maintained even when the weight of the vehicle acts on the steering function-equipped hub unit 1. Therefore, the steering function-equipped hub unit 1 can secure the rigidity to serve as a steering device. It should be noted that the rotation-permitting support components 4 are not limited to tapered roller bearings and may be angular contact ball bearings depending on conditions of use, such as maximum load. Even in that case, a preload can be applied in the same manner as above.

As shown in FIG. 4, the arm part 17 serves as a point of application of a supplementary steering force applied to the outer ring 19 of the turning shaft-equipped hub bearing 15 and is integrated with a part of an outer periphery of the outer ring 19 so as to protrude therefrom. The arm part 17 is rotatably connected to the output rod 25a which is a linear motion output part of the steering actuator 5 through the joint part 8. Thus, when the output rod 25a of the steering actuator 5 advances and retracts (i.e., moves linearly), the turning shaft-equipped hub bearing 15 is rotated or supplementarily steered about the turning axis A.

<Steering Actuator 5>

The steering actuator 5 includes: a motor 26 as a rotation drive source; a non-illustrated speed reduction gear 27 configured to reduce a speed of rotation of the motor 26; and a linear motion mechanism 25 configured to convert a forward and reverse rotary output of the speed reduction gear into a reciprocating linear motion of the output rod 25a. The motor 26 may be, for example, a permanent magnet synchronous motor, or a direct current motor, or an induction motor. The speed reduction gear may be, for example, a winding transmission mechanism such as a belt transmission mechanism, or a gear train or the like.

The linear motion mechanism 25 may be a feed screw mechanism of sliding screw type such as a trapezoidal thread screw and a triangle thread screw. In this example, a feed screw mechanism with a trapezoidal thread sliding screw is used. The linear motion mechanism 25 includes the feed screw mechanism and a linear motion mechanism body 25A which is a cover for covering components such as the feed screw mechanism. The feed screw mechanism includes a non-illustrated nut part and the output rod 25a which is a threaded shaft. The output rod 25a is prevented from rotating with respect to the linear motion mechanism body 25A. Note that it is also possible to use a mechanism for directly transmitting the driving force of the motor 26 to the linear motion mechanism 25 without interposition of a speed reduction gear.

<Effects and Advantages>

According to the steering function-equipped hub unit 1 as described above, the turning shaft-equipped hub bearing 15 supporting the wheel 9 can be arbitrarily rotated about the turning axis A by driving the steering actuator 5. This rotation takes place as supplementary steering in addition to steering according to an operation of the steering wheel by a driver, i.e., in addition to rotation of the knuckle 6 about the king pin axis K by the steering device 11 and makes it possible to independently steer a wheel. The angles of supplementary steering of the left and right wheels 9, 9 may be varied to arbitrarily change toe angles of the left and right wheels 9, 9.

Thus, the steering function equipped hub unit 1 may be used in any of steered wheels such as front wheels and non-steered wheels such as rear wheels. Where the steering function equipped hub units 1 are used in steered wheels, the hub units are mounted to wheels whose directions are changed by the steering device 11, so that they serve as mechanisms for turning the left and right wheels 9 by a small angle in an independent manner or in associated manner, in addition to steering according to an operation of the steering wheel by a driver.

Where the steering function-equipped hub units 1 are used in non-steered wheels, i.e., rear wheels 9R, the steering function of the steering function-equipped hub units 1 makes it possible to independently steer these wheels by a small angle by as with the front wheels 9F, although the whole hub units are not steered. When the steering angles of the rear wheels are set in phase with those of the front wheels 9F during turning, a yaw generated during steering can be suppressed to enhance stability of the vehicle 10. Even when driving straight, the left and right toe angles can be adjusted independently to ensure stability of driving.

In any case where the steering function-equipped hub units 1 are used in the front wheels 9F and/or the rear wheels 9R, a difference in the steering angles of the left and right wheels can be changed during turning depending on traveling speed. For example, where the steering function-equipped hub units 1 are used in the front wheels 9F, the steering geometry can be changed during driving in such a way that parallel geometry is assumed when turning in a high-speed range and Ackermann geometry is assumed when turning in a low-speed range. Where the steering function-equipped hub units 1 are used in the rear wheels 9R, the rear wheels 9R are steered during turning, so that a yaw is generated in the vehicle 10 to aid in turning. Thus, since the wheel angles can be arbitrarily changed while driving the vehicle 10, it is possible to improve motion performance, stability and safety of the vehicle 10.

Further, by suitably changing the steering angles of the left and right steered wheels, it is possible to reduce a turning radius of the vehicle 10 during turning to improve small-turn performance. Further, by adjusting the toe angles of the left and right steered wheels so as to fit different situations, it is possible to improve driving stability during driving straight and to effectively drive with a suppressed cornering drag during turning.

The unit support member 3 including the turning shaft-equipped hub bearing 15 rotatably attached thereto through the rotation-permitting support components 4 and the steering actuator 5 include the flange parts 3a and the end portion 25Aa, respectively, which are removably fixed to the knuckle 6 as the fixing parts. Thus, the individual components can be separately attached and detached when the steering function-equipped hub unit 1 is mounted in the vehicle 10, so that operations for attaching or detaching the hub unit to/from the vehicle 10 can be more easily performed than in a case where these components as a whole are treated as one assembly. When, e.g., abnormality occurs in a component of the steering function-equipped hub unit 1, only either one of the unit support member 3 and the steering actuator 5 which includes that component can be detached from the knuckle 6 for maintenance or replacement, and only necessary wires can be disconnected. Accordingly, this can improve ease of operations during maintenance and the like and also reduce the cost.

Since the steering actuator 5 and the unit support member 3 are attached with the knuckle 6 interposed therebetween, the steering function-equipped hub unit 1 as a whole can be designed compactly, so that the steering function-equipped hub unit can be received on an inner side with respect to the diameter of the wheel disc.

The unit support member 3 is attached to the knuckle 6 on the outer side in the widthwise direction of the vehicle 10, and the steering actuator 5 is attached to the knuckle 6 on the inner side in the widthwise direction of the vehicle 10. In this case, there can be shorter paths for connecting wiring such as power wires for the steering actuator 5 and sensor wires to the vehicle body side than those in a case where the steering actuator is attached to the chassis frame component on the outer side in the widthwise direction, and the wiring can be arranged so as to avoid bending. Therefore, this can facilitate arrangement of the wiring and improve ease of operations.

Other Embodiments

In the following description, the same reference numerals are used to denote parts that correspond to those previously described in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

In the above-described embodiment, the inner ring part 18b of the turning shaft-equipped hub bearing 15 is fixed to the hub axle part 18a by use of a nut. However, the attachment is not limited to this fashion. For example, as shown in FIG. 6, the inner ring part 18b may be fixed to the hub axle part 18a by fastening realized by a fastening part 18ab at an inboard-side end of the hub axle part 18a.

Figure 7:
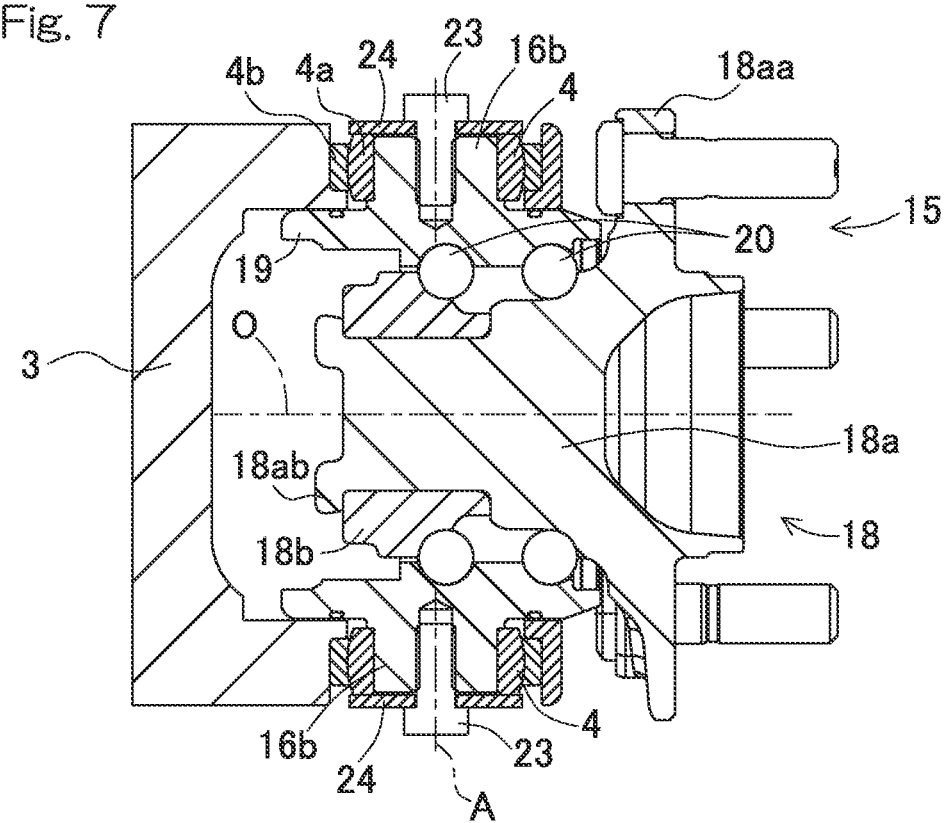
FIG. 7 is a vertical sectional view showing a variant of the steering function-equipped hub unit which is partially modified.

As shown in FIG. 7, each of the rotation-permitting support components 4 may be a sliding bearing. In this example, self-aligning spherical sliding bearings which can receive radial load and axial load in opposite directions are used as sliding bearings. Each of the spherical sliding bearings includes an inner ring 4a fitted to an outer periphery of a turning shaft 16b and an outer ring 4b fitted to the unit support member 3. In the example of FIG. 7, the inner ring part 18b is fixed to the hub axle part 18a by fastening realized by the fastening part 18ab. The inner ring part 18b, however, may be fixed to the hub axle part 18a by use of a fastening member such as a nut.

<Application to Non-Steered Wheels>

Figure 8:
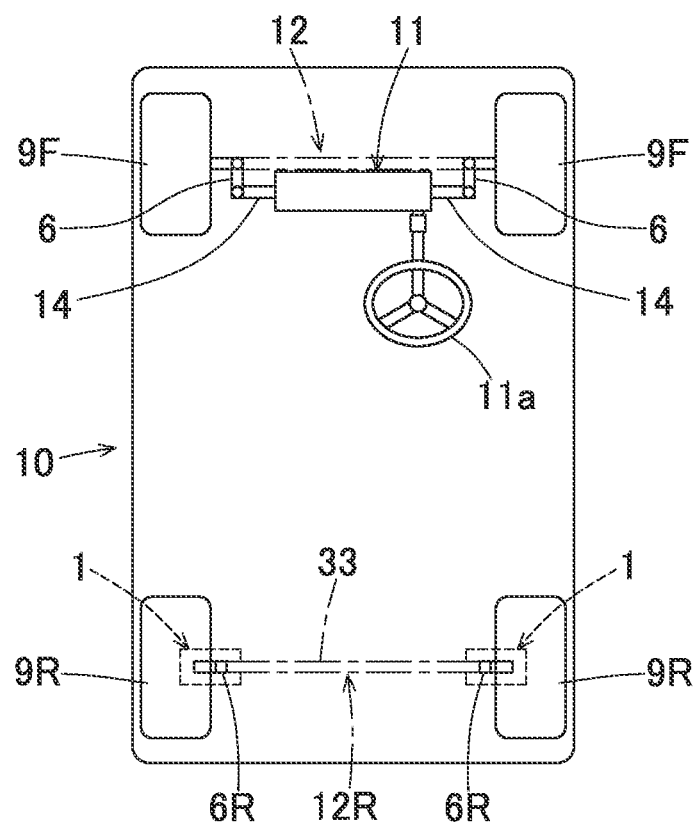
FIG. 8 is a schematic plan view showing another example of a vehicle including any one of the steering function-equipped hub units.

As shown in FIG. 8, in a front wheel-steering vehicle, the steering function-equipped hub unit 1 may be fixed to a chassis frame component 6R of a suspension device 12R supporting rear wheels 9R. The steering function-equipped hub unit 1 provided to a rear wheel 9 may steer the rear wheel by not only the small angle as discussed above, but also a relatively large angle (e.g. 10° to 20°) in independent manner from the other one of the left and right wheels depending on demand for vehicle control.

As the suspension device 12R, any of various suspension mechanisms described previously can be used. Where, for example, a torsion beam suspension is used as the suspension device 12R, a steering function-equipped hub unit 1 is fixed to an attachment part at each of left and right end portions of a beam 33 of the torsion beam suspension. The flange parts 3a (see FIG. 3) which are the fixing part of the unit support member 3 and the end portion 25Aa (see FIG. 3) which is the fixing part of the steering actuator 5 are removably fixed to each attachment part.

At each attachment part, the steering actuator 5 (see FIG. 3) and the unit support member 3 (see FIG. 3) are attached so as to face torsion beam attaching surfaces on opposite sides. In this construction, the unit support member 3 (see FIG. 3) is attached to an outboard-side torsion beam attaching surface of the attachment part, whereas the steering actuator 5 (see FIG. 3) is attached to an inboard-side torsion beam attaching surface of the attachment part. After the attachment, the steering actuator 5 and the arm part 17 of the turning shaft-equipped hub bearing 15 are connected by the joint part 8 (see FIG. 4). As with the above-described embodiment, the unit support member 3 and the steering actuator 5 may be removably attached to a same surface of the attachment part on the torsion beam.

Figure 9:
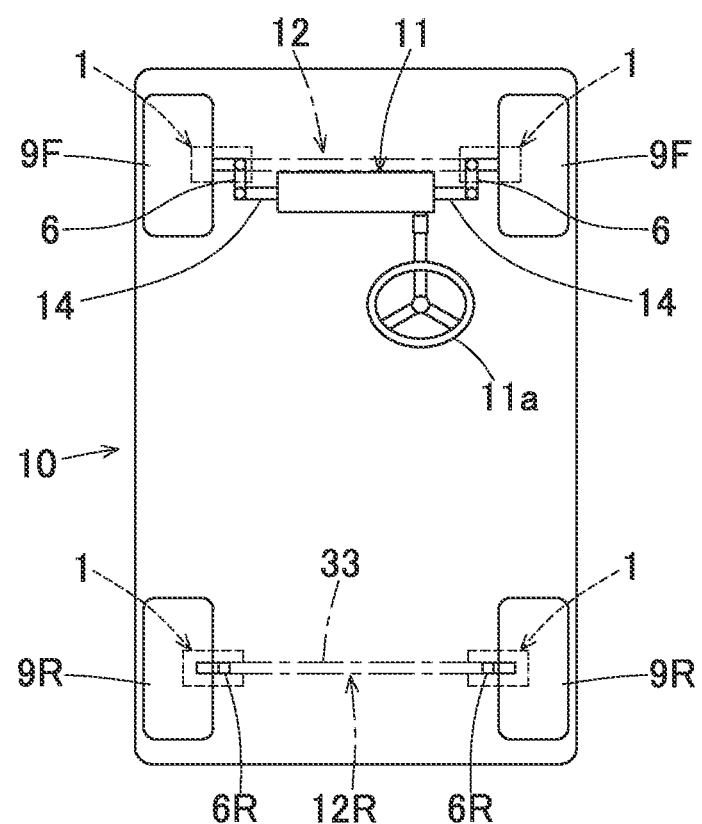
FIG. 9 is a schematic plan view showing yet another example of a vehicle including any one of the steering function-equipped hub units.

Besides, as shown in FIG. 9, the steering function-equipped hub unit 1 may be used in each of the left and right front wheels 9F, 9F which are steered wheels as well as the left and right rear wheels 9R, 9R which are non-steered wheels.

The steering actuator 5 and the arm part 17 may be arranged not only on the rear side with respect to an axle, but also on the front side with respect to the axle.

<Steering System>

As shown in FIG. 4, the steering system includes the steering function-equipped hub unit 1 according to any one of the embodiments and a control device 29 configured to control the steering actuator 5 of the steering function equipped hub unit 1. The control device 29 includes a steering control section 30 and an actuator drive control section 31. The steering control section 30 is configured to output a current command signal S2 according to a supplementary steering angle command signal (command signal) S1 given by a higher-order control section 32.

The higher-order control section 32 is a control unit superordinate to the steering control section 30. For example, the higher-order control section 32 may be an electric control unit (or a vehicle control unit, abbreviated as VCU) for performing general control of a vehicle. The actuator drive control section 31 is configured to output a current (drive current) C1 according to a current command signal S2 inputted from the steering control section 30 to drive and control the steering actuator 5. The actuator drive control section 31 controls power to be supplied to coils of the motor 26. The actuator drive control section 31 is constituted as, for example, a non-illustrated half-bridge circuit including a switch element and is configured to performs PWM control for determining a motor application voltage on the basis of an ON-OFF duty cycle of the switch element. This makes it possible to change the angle of the wheel by a small angle in addition to steering according to an operation of the steering wheel by a driver. Even when driving straight, the toe angles can be adjusted so as to fit different situations.

In the steering system, the steering actuators 5, 5 may be operated according to a command or the like from a non-illustrated autonomous driving device or driving assistance device, in addition to or instead of an operation of the steering wheel by a driver.

Although the present invention has been fully described in connection with the embodiments thereof, the embodiments disclosed herein are merely examples in all respects and are not to be taken as limiting the scope of the present invention in any way whatsoever. The scope of the present invention is to be determined by the appended claims, not by the above description, and is intended to include any change made within the scope of claims or equivalent thereto. The present invention is not limited to the above-described embodiment, and various additions, modifications, or deletions may be made without departing from the scope of the present disclosure.

REFERENCE NUMERALS

1 . . . steering function-equipped hub unit
3 . . . unit support member
3a . . . flange part (fixing part)
5 . . . steering actuator
6 . . . knuckle (chassis frame component)
6R . . . chassis frame component
9 . . . wheel
10 . . . vehicle
15 . . . turning shaft-equipped hub bearing
16b . . . turning shaft
18 . . . inner ring
19 . . . outer ring
20 . . . rolling element
25A . . . linear motion mechanism body
25Aa . . . end portion
25a . . . output rod (linear motion output part)
A . . . turning axis

What is claimed is:

1. A steering function-equipped hub unit configured to steer a wheel, the steering function-equipped hub unit comprising:
a turning shaft-equipped hub bearing including an inner ring, an outer ring, and rolling elements in double rows interposed between the inner ring and the outer ring, the turning shaft-equipped hub bearing having a turning shaft extending in a vertical direction;
a unit support member rotatably supporting the turning shaft-equipped hub bearing about a turning axis of the turning shaft; and
a steering actuator configured to rotationally drive the turning shaft-equipped hub bearing about the turning axis,
wherein each of the unit support member and the steering actuator includes a fixing part to be removably fixed to a chassis frame component of a vehicle.

2. The steering function-equipped hub unit as claimed in claim 1, wherein the steering actuator and the unit support member are attached with the chassis frame component interposed between the steering actuator and the unit support member.

3. The steering function-equipped hub unit as claimed in claim 1, wherein the unit support member is attached to the chassis frame component on an outer side in a widthwise direction of the vehicle, and the steering actuator is attached to the chassis frame component on an inner side in the widthwise direction of the vehicle.

4. The steering function-equipped hub unit as claimed in claim 1, wherein the unit support member includes a flange part on an opposite side to a wheel attachment part of the turning shaft-equipped hub bearing in an axial direction of the wheel, the flange part configured to be fixed to the chassis frame component in an overlapping manner as the fixing part of the unit support member.

5. The steering function-equipped hub unit as claimed in claim 1, wherein the steering actuator includes a linear motion mechanism body and a linear motion output part which is able to advance from and retract into the linear motion mechanism body and is configured to apply a steering force to the outer ring of the turning shaft-equipped hub bearing; an end portion of the linear motion mechanism body from which the linear motion output part advances serves as the fixing part of the steering actuator; and the end portion of the linear motion mechanism body is configured to be fixed to the chassis frame component in an overlapping manner.

6. A vehicle comprising the steering function-equipped hub unit as claimed in claim 1.

\* \* \* \* \*